US010917860B1

United States Patent
Montgomery et al.

(10) Patent No.: US 10,917,860 B1
(45) Date of Patent: Feb. 9, 2021

(54) SYSTEM AND METHOD FOR USING DUAL POWER METERS FOR SATELLITE TERMINAL CALIBRATION

(71) Applicant: HUGHES NETWORK SYSTEMS, LLC, Germantown, MD (US)

(72) Inventors: Guy Montgomery, Potomac, MD (US); George Choquette, Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/589,924

(22) Filed: Oct. 1, 2019

(51) Int. Cl.
*H04W 52/24* (2009.01)
*H04W 52/52* (2009.01)
*H04W 84/06* (2009.01)

(52) U.S. Cl.
CPC ......... *H04W 52/246* (2013.01); *H04W 52/52* (2013.01); *H04W 84/06* (2013.01)

(58) Field of Classification Search
CPC .... H04W 52/52; H04W 52/246; H04W 84/06
See application file for complete search history.

(56) References Cited

U.S. PATENT DOCUMENTS

| 10,079,637 B2 | 9/2018 | Harrington et al. |
| 2002/0132580 A1 | 9/2002 | Buer |
| 2017/0250455 A1* | 8/2017 | Runyon ................. H01Q 1/084 |

* cited by examiner

*Primary Examiner* — Keith Ferguson
(74) *Attorney, Agent, or Firm* — Sheppard, Mullin, Richter & Hampton LLP

(57) ABSTRACT

Some implementations of the disclosure are directed to a satellite terminal comprising: a modem; and a radio frequency unit (RFU) configured to amplify and frequency upconvert a transmit signal for transmission over an inroute channel of a satellite communications network, the RFU comprising: an input power meter configured to measure a first power level of an intermediate frequency (IF) signal transmitted from the modem to an input of the RFU; an upconverter configured to frequency upconvert the IF signal to obtain a radio frequency (RF) signal; and an output power meter configured to measure a second power level of the RF signal. By taking the readings from the input and output power meters of the RFU, one or more calibration related functions, including a determination of the power loss due to the IF cable or a determination of the upconverter's gain, may be automatically performed at the satellite terminal.

20 Claims, 9 Drawing Sheets

600

| SIGNAL POWER LEVEL 1 | | | |
|---|---|---|---|
| Frequency | RFU Power In | RFU Power Out | Gain |
| $f_{11}$ | $Pi_{11}$ | $Po_{11}$ | $G_{11}$ |
| $f_{12}$ | $Pi_{12}$ | $Po_{12}$ | $G_{12}$ |
| . . . | | | |
| $f_{1n}$ | $Pi_{1n}$ | $Po_{1n}$ | $G_{1n}$ |

\* \* \*

| SIGNAL POWER LEVEL M | | | |
|---|---|---|---|
| Frequency | RFU Power In | RFU Power Out | Gain |
| $f_{m1}$ | $Pi_{m1}$ | $Po_{m1}$ | $G_{m1}$ |
| $f_{m2}$ | $Pi_{m2}$ | $Po_{m2}$ | $G_{m2}$ |
| . . . | | | |
| $f_{mn}$ | $Pi_{mn}$ | $Po_{mn}$ | $G_{mn}$ |

FIG. 6

SYSTEM AND METHOD FOR USING DUAL POWER METERS FOR SATELLITE TERMINAL CALIBRATION

BACKGROUND

A typical satellite Internet system comprises subscriber terminals, a satellite, a ground station, and connectivity to the internet. Communication in such a system occurs along two paths: 1) a forward path comprising a path from the internet to the ground station to an uplink to the satellite to a downlink to the subscriber terminal; and 2) a return path comprising an uplink from a subscriber terminal to the satellite to a downlink to the ground station to the internet. Along the forward path, the transmission from the ground station to the satellite terminal may be referred to as an outroute transmission. Along the return path, the transmission from the satellite terminal to the ground station may be referred to as an inroute transmission.

Satellite terminals such as very Small Aperture Terminals (VSATs) are commonly used as subscriber terminals for transmitting and receiving wireless signals on phase modulated carriers in satellite communications systems. On the transmission (inroute) side, a satellite terminal may include an indoor unit (IDU) for modulating a signal with information, which may include a satellite Internet modem which can be connected to a customer's computer equipment. The satellite terminal may also include an outdoor unit (ODU) made up of a Radio Frequency Unit (RFU) that provides amplification and upconversion of the transmit radio signals, and an antenna (e.g., parabolic dish antenna) for focusing and transmitting the upconverted signal to a satellite.

SUMMARY

Implementations of the disclosure are directed to using a satellite terminal RFU with two power meters, one at the input of the RFU and one at the output of the RFU, to perform calibrated related functions at the satellite terminal.

In one embodiment, a satellite terminal comprises: a modem; and a RFU configured to amplify and frequency upconvert a transmit signal for transmission over an inroute channel of a satellite communications network, the RFU comprising: an input power meter configured to measure a first power level of an intermediate frequency (IF) signal transmitted from the modem to an input of the RFU; an upconverter configured to frequency upconvert the IF signal to obtain a radio frequency (RF) signal; and an output power meter configured to measure a second power level of the RF signal. In some implementations, the input power meter and the output power meter are non-burst mode power meters.

In some implementations, the satellite terminal further comprises: a communication link between the modem and the RFU, where the modem is configured to receive the measured first power level and the measured second power level over the communication link. In some implementations, the modem is configured to calculate a gain value of the upconverter using the received measured first power level and measured second power level. For example, the modem may be configured to calculate the gain value by performing a gain calibration process, the gain calibration process comprising: generating a plurality of continuous wave (CW) carrier signals, each of the plurality of CW carrier signals generated at a respective frequency within a frequency range; transmitting each of the plurality of CW carrier signals to the input of the RFU; for each of the plurality of transmitted CW carrier signals, receiving from the RFU a first power level measurement made by the input power meter and a second power level measurement made by the output power meter; determining an RFU gain value for each of the frequencies based on the received first power level measurement and the second power level measurement; and using the determined RFU gain values to create a gain table.

In some implementations, the modem is configured to calculate the gain value during a calibration process for establishing a limit on a linear region of operation of the RFU, the calibration process comprising: generating each of a plurality of continuous wave (CW) carrier signals at a respective power level of a plurality of power levels; transmitting each of the plurality of CW carrier signals to the input of the RFU; for each of the plurality of transmitted CW carrier signals, determining an RFU gain value for each of the plurality of power levels based on power level measurements made by the input power meter and the output power meter; and using the plurality of determined RFU gain values to determine a maximum power level of the plurality of power levels at which RFU gain stops increasingly linearly with an increasing power level.

In some implementations, the modem is configured to periodically perform the gain calibration process. In some implementations, the modem is configured to perform the gain calibration process in response to a command transmitted by a network management system to the satellite terminal over an outroute communication channel of the satellite communications network.

In some implementations, the RFU comprises a switch that, when opened, prevents RF signals from entering an antenna of the satellite terminal from the RFU, where during initialization of the gain calibration process, the modem is configured to signal the RFU over the communication link to open the switch.

In some implementations, the satellite terminal further comprises: an IF cable connecting the modem to the RFU, wherein the modem is configured to transmit the IF signal over the IF cable; and a communication link between the modem and the RFU, wherein the modem is configured to receive the measured first power level over the communication link.

In some implementations, the modem is configured to calculate a cable loss value over the IF cable using the received measured first power level and a power level at which the modem transmitted the IF signal. For example, the modem may be configured to calculate the cable loss value by performing a cable loss calibration process, the cable loss calibration process comprising: generating a plurality of continuous wave (CW) carrier signals, each of the plurality of CW carrier signals generated at a respective frequency within a frequency range; transmitting each of the plurality of CW carrier signals to the input of the RFU; for each of the plurality of transmitted CW carrier signals, receiving from the RFU a first power level measurement made by the input power meter; and determining a cable loss value for each of the frequencies based on the received first power level measurement and a power level at which the modem generated the CW carrier signal for the frequency. In some implementations, the modem is configured to perform the cable loss calibration process in response to a command transmitted by a network management system to the satellite terminal over an outroute communication channel of the satellite communications network. In some implementations, the communication link is integrated in the IF cable.

In one embodiment, a method comprises: generating, via a modem of a satellite terminal, a plurality of continuous wave (CW) carrier signals, each of the plurality of CW carrier signals generated at a respective frequency within a frequency range or a respective power level within a power level range; receiving each of the plurality of CW carrier signals from the modem at an input of a radio frequency unit (RFU) of the satellite terminal, the RFU comprising an input power meter, an upconverter, and an output power meter; for each of the plurality of received CW carrier signals: measuring, via the input power meter, an input power level of the CW carrier signal; upconverting, via the upconverter, the CW carrier signal; and measuring, via the output power meter, an output power level of the upconverted CW carrier signal; and determining an RFU gain value for each of the frequencies or power levels based on the input power level measurement and the output power level measurement.

In some implementations, the method further comprises: receiving at the modem, from the RFU, the input power level measurement and the output power level measurement made for each of the plurality of received CW carrier signals, wherein the modem is configured to determine the RFU gain value for each of the frequencies or power levels based on the input power level measurement and the output power level measurement.

In some implementations, the modem is configured to perform the operations of generating, receiving from the RFU, and determining in response to a command transmitted by a network management system to the satellite terminal over an outroute communication channel of the satellite communications network.

In some implementations, the modem is configured to periodically perform the operations of generating, receiving from the RFU, and determining.

In some implementations, the method further comprises: using the determined RFU gain values to create a gain table.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 6 illustrates an example gain table, in accordance with implementations of the disclosure.

Figure 1:
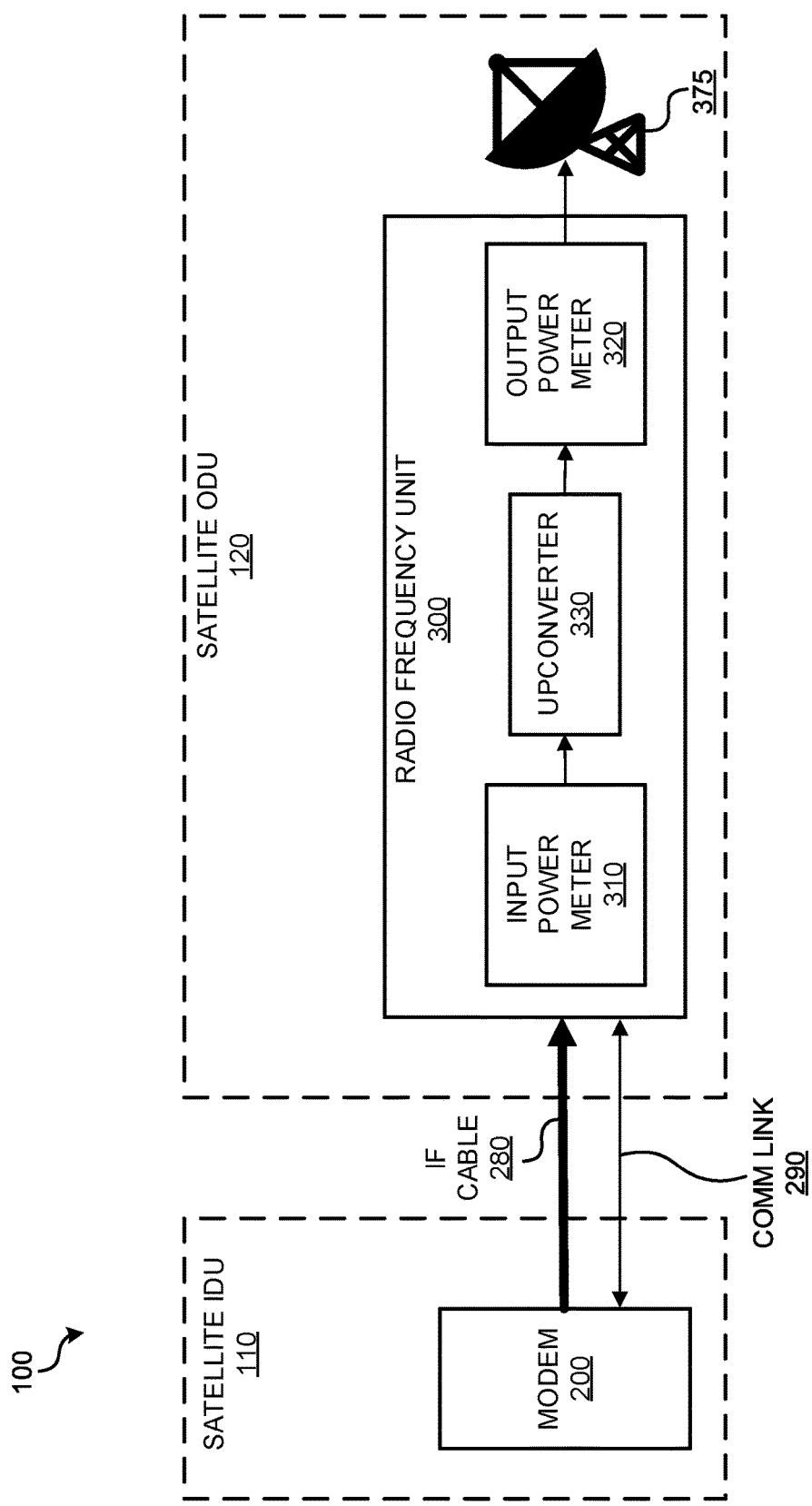
FIG. 1 is a block diagram illustrating some components of a satellite terminal with which embodiments of the disclosure may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As summarized above, a satellite terminal may include a satellite IDU including a modem and a satellite ODU including a RFU. A cable may carry Intermediate Frequency (IF) signals from an output of the modem to an input of the RFU. Loss through such a connecting cable may vary based on certain factors or variables, including, for example, the frequency of the signal traveling through the cable, the length of the cable, and/or the type of cable being utilized. In some mobile satellite terminal installations (e.g., retrofit installations into an environment where a prior cable exists), the length and/or type of the IF cable may vary from installation to installation, and so the length or type of the cable, and therefore the loss on the IF cable link, is not known prior to the time of installation. Knowing the IF cable loss may be necessary to correctly set power levels in the system so that it may operate properly. Accordingly, the cable loss may need to be determined at the time of install once the cable has been cut to the correct length.

Current methods of establishing loss due to an IF cable may suffer from a number of disadvantages. For example, some existing methods rely on the use of an external power detector to determine cable loss. In such methods, the cable is disconnected from the RFU and an external power meter is connected to make the measurements. In such methods, however, the location of the RFU may make it difficult to attach the power meter, especially in situations after the initial install where the RFU cabling may have been permanently affixed, or when other equipment may now make access to the RFU difficult. Additionally, a connection is required from the modem to the external power meter in order to automate the method of measuring cable loss, but the RFU may be located a long distance from the modem, making it difficult to make the required connection.

As another example, some existing methods of establishing loss due to an IF cable rely on a fixed length of cable with a known loss for all installations. In such methods, a known length of cable, with known loss characteristics, is used for all installations. This requires that the length of the cable used has to be sufficient for the worst case installation. This presents some disadvantages. In cases where the distance from the modem to the RFU is shorter than the worst case cable length, the excess cable will have to be coiled and stored. In cases where the distance from the modem to the RFU is shorter than the worst case cable length, the installation costs are higher due to the costs of the excess cable.

As a further example, some existing methods of establishing loss due to an IF cable rely on a set of cables of predetermined length and select the best fit cable at the time of installation. In such methods, more cables have to be made a priori than will be needed for the install, resulting in additional costs. Additionally, the installation team is required to carry around sets of cables rather than a single cable spool.

Another consideration besides cable loss in the calibration of a satellite terminal is the determination of RFU gain. During operation, a satellite terminal should maintain its output power so that it does not exceed either of two thresholds: i) the output power should not exceed the value in which the RFU is in its linear region of operation; and ii) the output power should not exceed the value at which regulatory power spectral density limits are exceeded. Exceeding the max linear power value will cause signal degradation, with potential performance degradation and also the potential for out-of-band transmissions.

In some present Multi-Frequency Time-Division multiple-access (MF-TDMA) systems, the determination of the current output power of the RFU may be performed using a burst-mode power detector that measures the real time output power of a transmission. However, burst mode power detectors may be complicated and expensive to make, and require very careful characterization. In other present MF-TDMA systems, the determination of the current output power of the RFU may be performed using a gain calibration table that is used by a modem to characterize gain performance of the RFU over frequency. The modem uses this table in conjunction with the knowledge of the modem's current output power to calculate the current output power of the RFU. Typically, this table is created at the time of manufacture using sophisticated test equipment, and supplied to the modem at the time of installation. As the table may be specific to the specific RF unit, and not just the RF unit type, this may present a significant configuration management challenge to ensure the modem has the correct gain table. This may also apply to the case where an RFU may be replaced in the field post install due to equipment failure, etc.

To address the aforementioned disadvantages of prior methods of establishing loss due to an IF cable, and to address the aforementioned disadvantages of prior methods of determining RFU gain, implementations of the disclosure are directed to using a satellite terminal RFU with two power meters, one at the input of the RFU and one at the output of the RFU, to perform calibrated related functions at the satellite terminal, including a determination of cable loss and/or RFU gain. In particular, by using knowledge of the output power of the modem in combination with readings from the input and output power meters of the RFU, one or more calibration related functions may be automatically performed at the satellite terminal. A determination of the power loss due to the IF cable may be determined at any time (e.g., during the installation process, during cable repair or replacement, when cable characteristics change, etc.) based on readings of the modem's output power and the RFU's input power from the RFU input power detector. Additionally, a determination of the RFU upconverter gain may be made on site based on readings of the RFU's input power from the RFU input power detector and the RFU's output power from the RFU output power detector. As such, by virtue of using an RFU with dual power meters, calibration of the power loss due to the IF cable and/or calibration of the RFU gain may be run during and after installation, at the satellite terminal, on an on demand or periodic basis, allowing the terminal to be recalibrated to compensate for variations over time.

FIG. 1 is a block diagram illustrating some components of a satellite terminal 100 with which embodiments of the disclosure may be implemented. For simplicity of discussion, some components of terminal 100 may be omitted from FIG. 1. For example terminal 100 may use a downconverter (not depicted) of RFU 300 to provide down conversion of radio waves collected from antenna 375.

Satellite terminal 100 may be designed as a mobile satellite terminal. For example, satellite terminal 100 may be designed to be coupled to or integrated into a terrestrial or aerial vehicle (e.g., a truck or plane) or an aquatic vehicle (e.g., a boat). As another example, satellite terminal 100 may be designed as a portable terminal that may be carried by a user. In other implementations, satellite terminal 100 may be designed to installed at a fixed terrestrial site. For example, satellite terminal 100 may be a very small aperture terminal (VSAT) configured to be installed at a customer's business or home to enable satellite communications.

As depicted, satellite terminal 100 includes a satellite indoor unit (IDU) 110 and a satellite outdoor unit (ODU) 120. The satellite IDU 110 includes a modem 200, and the satellite ODU 120 includes a RFU 300 and antenna 375. During transmission, modem 200 may be configured to convert digital data received from a user device into an intermediate frequency (IF) signal, and transmit, over IF cable 280 (e.g., a coaxial cable), the intermediate frequency (IF) signal to RFU 300 for amplification and upconversion.

RFU 300 includes an input power meter 310, an upconverter 330, and an output power meter 320. Input power meter 310 may be configured to detect power at the input of RFU 300, before upconversion, and output power meter 330 may be configured to detect power at the output of RFU 300, after upconversion. In some implementations, the input and output power meters 310, 330 may be non-burst mode power detectors that operate in a continuous wave (CW) carrier mode, which as further discussed below, may provide a relatively low cost method of characterizing gain of upconverter 330 in contrast to using a burst-mode power detector.

Upconverter 330 of RFU 300 may be used in the transmission of satellite inroute signals via antenna 375 by frequency upconverting an IF signal received by RFU 300 from modem 200 over IF cable 280, thereby obtaining a radio frequency (RF) signal. Upconverter 330 may also amplify the signal. The frequency upconverted (and amplified) signal may be sent to antenna 375, which may focus the signal into a narrow beam for transmission to a satellite. In some implementations, upconverter 330 may be mounted on antenna 375. For example, upconverter 330 may be a block upconverter (BUC) mounted on a dish. The antenna 375 may be any suitable antenna design (e.g., small aperture parabolic antenna design) configured to transmit and receive electromagnetic signals to and from one or more satellites.

Communication link 290 may enable data communication between modem 200 and RFU 300 for performing the cable loss calibration and/or RFU gain calibration methods further described below. In some implementations, communication link 290 may be a wired communication link such as an Ethernet cable connection. In some implementations, communication link 290 may be a wireless communication link such as low power WiFi. In some implementations, communication link 290 may be provided over IF cable 280. For example, a Digital Satellite Equipment Control (DiSEqC) communication protocol may be used to enable bidirectional data communication over a coaxial cable 280. As another example, a serial communication link may be embedded in IF cable 280. It should be appreciated that any number of communication methods, wired or wireless, may be used to enable data communication between modem 200 and RFU 300.

Figure 2:
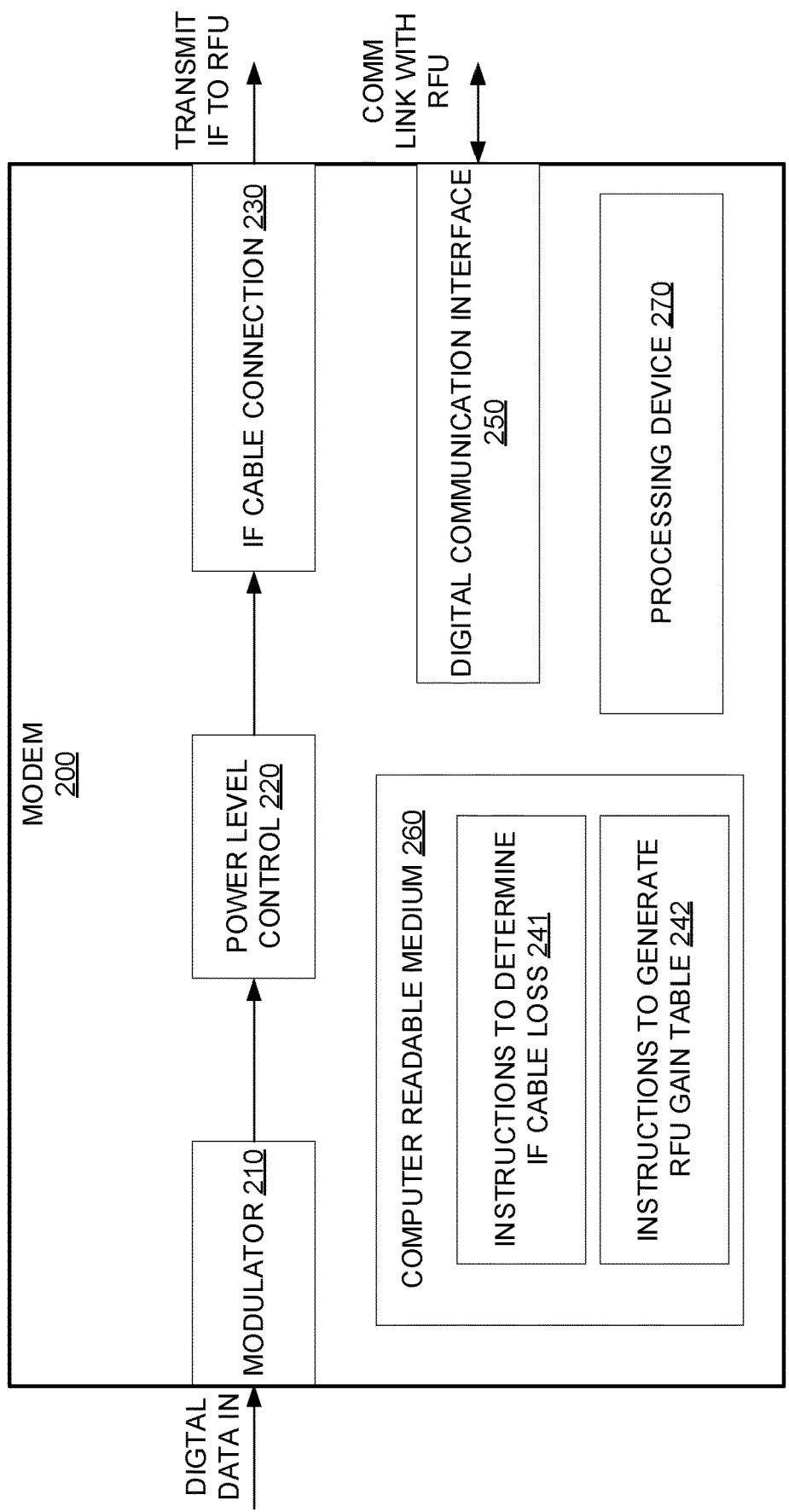
FIG. 2 is a block diagram illustrating some components of an example modem, in accordance with particular implementations of the disclosure.

FIG. 2 is a block diagram illustrating some components of an example modem 200, in accordance with particular implementations of the disclosure. Modem 200 may include a modulator 210, a power level control 220, an IF cable connection 240, a digital communication interface 240, a computer readable medium 260, and a processing device 270. Modulator 210 is configured to convert digital data received from a user device into an IF signal. Power level control 220 may decrease or increase the output level of the IF signal provided to RFU 300 via an IF cable 280. The IF cable 280 may connected to modem 200 through IF cable connection 230 (e.g., a coaxial port).

The digital communication interface 250 enables communications with RFU 300 over communication link 290. For example, digital communication interface 250 may be used to receive power meter measurements made by input power meter 310 or output power meter 320 of RFU 300. Additionally, interface 250 may be used by modem 200 to control circuitry or components of RFU 300. In implementations where communication may occur over the IF cable 280, interface 250 may not be needed.

Computer readable medium 260 stores instructions that, when executed by processing device 270, cause modem 200 to perform operations in accordance with the disclosure. For example, computer readable medium 260 stores instructions 241 that, when executed by processing device 270, determine IF cable loss over an IF cable 280. Additionally, computer readable medium 260 may store instructions 242 that, when executed by processing device 270, generate an RFU gain table. Computer readable medium 260 may also be used to store received power meter measurements, a gain table, and other data that may be used during operation of modem 200.

Figure 3:
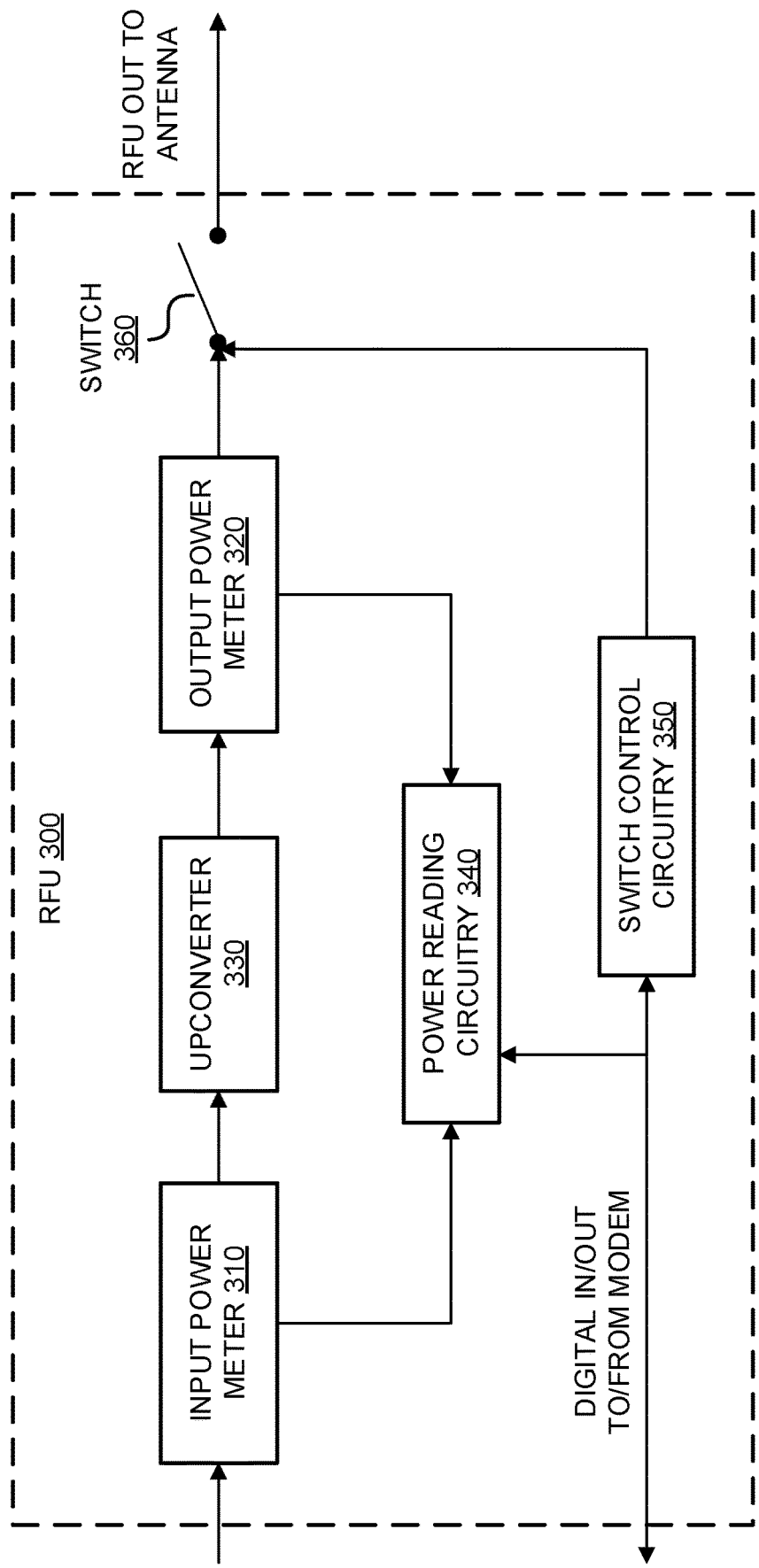
FIG. 3 is a block diagram illustrating example components of RFU, in accordance with particular implementations of the disclosure.

FIG. 3 is a block diagram illustrating example components of RFU 300, in accordance with particular implementations of the disclosure. In addition to input power meter 310, upconverter 330, and output power meter 320 discussed above, RFU 300 may include power reading circuitry 340, switch control circuitry 350, and switch 360. Power reading circuitry may be used to read back measurements made by power meters 310 or 320 to modem 200. For example, power measurements made in watts, milliwats, microwatts, or in decibel milliwatts (dBm) may be read back to the modem 200. In some implementations, power reading circuitry 340 may store measurements in an associated memory.

Switch 360 may be switched via switch control circuitry 350. Switch 360 may be opened to stop RF energy from entering the antenna 375 but permit power measurements by input power meters 310 and 320 during IF cable loss or RFU gain measurements. For example, during IF cable loss or RFU gain measurements, CW carriers may be generated. To prevent the carrier from appearing on the satellite spectrum, switch 360 may be opened. In alternative implementations, switch control circuitry 350 and switch 360 may be excluded from RFU 300. In such implementations, some free satellite spectrum could be dedicated for the purpose of recalibrating IF cable loss or RFU gains. In some implementations, the antenna 375 could be steered away from the satellite to prevent the carrier from appearing on the satellite spectrum.

In some implementations, power reading circuitry 340 and switch control circuitry 350 may be integrated into a single device. For example, a microcontroller may be configured to read back power level measurements (e.g., by power meters 310 and 320) to modem 200 over communication link 290. Additionally, the microcontroller may control switch 360 in response to control signals received from modem 200.

As noted above, during operation, the estimated power loss along an IF cable 280 may be used by a modem 200 to determine a power level for transmissions. In particular, a modem 200 may utilize a power level control 220 to set the power level such that the upconverter 330 is not saturated, where saturation refers to a maximum RF power capability where amplifier output no longer behaves linearly to an increase in power, regardless of the amount of input power. Overdriving an amplifier or trying to extract greater than the rated power causes the amplifier to go into compression, which consequently and undesirably, results in signal distortion. Thus, to avoid compression/saturation, it is preferable to measure the power being transmitted to the upconverter so as to avoid a situation where the upconverter reaches its compression point. That is, the power from the modem 200 should be set below the compression point at the upconverter so that the upconverter can operate in the linear portion of its input/output characteristics.

While conventional methods determine cable loss during initial install, the performance of the IF cable link may change over time. This could be due to environmental factor such as water ingress into the IF cable 280, degradation of the connector performance for the connectors between the IF cable 280 and the modem 200 and/or RFU 300, etc., and also aging factors on the cable itself. Various implementations of the disclosure allow for a cable calibration exercise to be commanded remotely, and the results reported back to an operator, so that adjustments to the system can be made to compensate for the change in IF link performance. This calibration exercise may be performed automatically on an on-demand or periodic basis.

Figure 4:
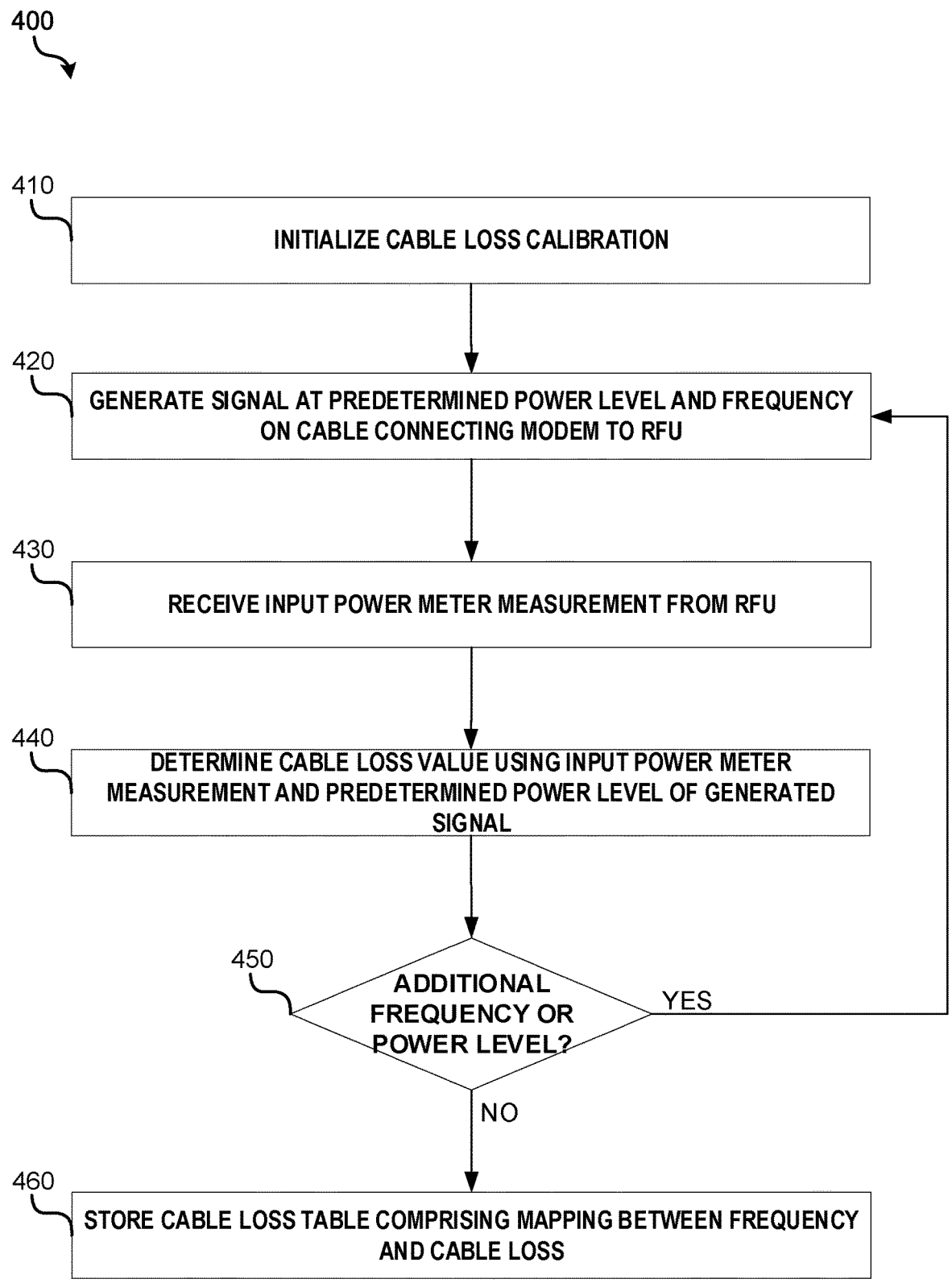
FIG. 4 is an operational flow diagram illustrating an example method of estimating IF cable power cable power loss, in accordance with implementations of the disclosure.

To this end, FIG. 4 is an operational flow diagram illustrating an example method 400 of estimating IF cable power cable power loss, in accordance with implementations of the disclosure. Method 400 may be implemented in a satellite terminal 100 to estimate power loss over the IF cable 280 connection from an output of modem 200 to an input of RFU 300. In some implementations, method 400 may be implemented in response to a processing device 270 of modem 200 executing instructions 241 for determining IF cable loss. Method 400 may be implemented at any appropriate time, including during the satellite terminal installation process, when the cable is repaired or replaced, or when changes in cable characteristics over time occur due to environmental or other effects.

At operation 410, cable loss calibration for an IF cable 280 is initialized. The cable loss calibration process may be initialized at the modem 200. In some implementations, the cable loss calibration process is initialized at modem 200 in response to a command from a remote network management system (NMS). The NMS may be a central NMS that is part of a network operations control center for a satellite communications network. In such implementations, the NMS may issue an instruction or command to satellite terminal 100 over a satellite outroute channel (i.e., along an outroute from the control center to a satellite to the satellite terminal) to perform the cable loss calibration process. The instruction may cause modem 200 to begin the calibration process.

In some implementations, cable loss calibration is initialized at modem 200 by an installer installing the IF cable 280 for the first time. In some implementations, the cable loss calibration process is initialized on site by a local operator or maintainer of the satellite terminal equipment.

In some implementations, the cable loss calibration process may be automatically performed on a periodic basis. For example, the cable loss calibration process may be automatically performed after a number of days, every week, after a number of weeks, every month, after a number of months, once a year, etc.

As part of initialization of the cable loss calibration process, and in cases where satellite terminal 100 is a satellite terminal with a steerable antenna, the antenna may be steered award from any operational satellites (e.g., away from the equatorial satellite plane) such that no interference (e.g., from transmission of a CW carrier) is caused during calibration. The command to steer the antenna away may be initiated by modem 200, a NMS, and/or some other system or device that may cause the antenna to steer. Alternatively, in cases suitable for both fixed and steerable antennae, and without steering the antenna, the modem 200 may signal switch control circuitry 350 of RFU 300 over communication link 290 to open switch 360 such that the power does not leave the RFU, and thus no interference is caused (e.g., from transmission of a CW carrier). In some implementations, the input power meter 310 may be set to operate in a CW mode as part of the initialization process.

At operation 420, the modem 200 generates a signal at a predetermined power level and frequency. The signal is transmitted on IF cable 280 to an input of RFU 300. The modem 200 may generate a CW carrier signal or tone with a known frequency and power on the cable connecting the modem 200 to the RFU 300. The input power meter 310 of RFU 300 may receive the CW signal transmitted over cable 280 and detect a power level of the signal at the input of the RFU 300. The input power meter 310 may output a power reading in watts, milliwats, microwatts, decibel milliwatts (dBm), or some other suitable form that may be converted into a power reading.

At operation 430, the modem 200 receives the input power meter reading from RFU 300. For example, the reading may be received over communication link 290. As previously noted, communication link 290 may be part of cable 280 or separate from cable 280. For example, the modem 200 may issue a command via the DiSEqC protocol requesting the input power meter reading. The input power meter reading may be read back from power reading circuitry 340 of RFU 300.

At operation 440, a cable loss value is determined using the received input power meter reading and the predetermined power level of the signal generated at the modem 200. In particular, the input power meter reading may be subtracted from the modem output power to determine the given cable loss value. In some implementations, a plurality of power measurements may be made at the input power meter 310 for a CW carrier signal transmitted at a given power level and frequency. These measurements may be averaged to obtain a power meter reading for a given power level and frequency. This average may be subtracted from the modem output power.

Thereafter, the modem may vary the frequency of the measurement signal, and can also vary the output power level of the modem such that the loss of the cable over frequency and power may be characterized. If there are additional frequency and power levels at which to generate CW carrier signals (decision 450), operations 420-440 may iterate. As such, the generation of CW carrier signals may occur over a plurality of different frequencies and/or power levels over which the modem is designed to operate. The measurements may occur over a particular frequency band of operation. The steps or frequency ranges within the band of operation may vary. For example, measurements may done over steps of 50 MHz over a given band of operation. At each given frequency and power level, input power meter 310 may output a power reading of the measured power at the input of RFU 300.

At operation 460, a cable loss table that provides a mapping between cable loss and frequency is stored. For example, the determined cable loss values may be stored in a data repository of the modem in the form of, e.g., a table that correlates calculated cable loss data to frequency and/or power level of the modem 200. Thus, for each frequency or frequency range at which the power output of the modem is measured, as described above, a cable loss value can be calculated and associated with the frequency/frequency range. In some implementations, the table may expanded through extrapolation and/or interpolation to obtain cable loss values for additional frequencies and/or modem power levels. For example, a linear regression may be applied to the obtained values. In alternative implementations, some other data structure besides a cable loss table may be used to provide a mapping between cable loss and frequency and/or signal power.

Following characterization of the cable loss, the output power of the modem 200 (e.g., using power level control 220) may be adjusted during regular operation to account for cable loss. For example, the table in which the calculated cable loss data is stored can be accessed and the values contained therein, applied to a given frequency and power level to obtain cable loss values. For a given frequency, the output power of the modem may be adjusted to account for the cable loss based on the cable loss value obtained from the table, e.g., the overall power attenuation to be used during the actual transmission of data between the modem and RFU may be calculated using the cable loss value.

Figure 5:
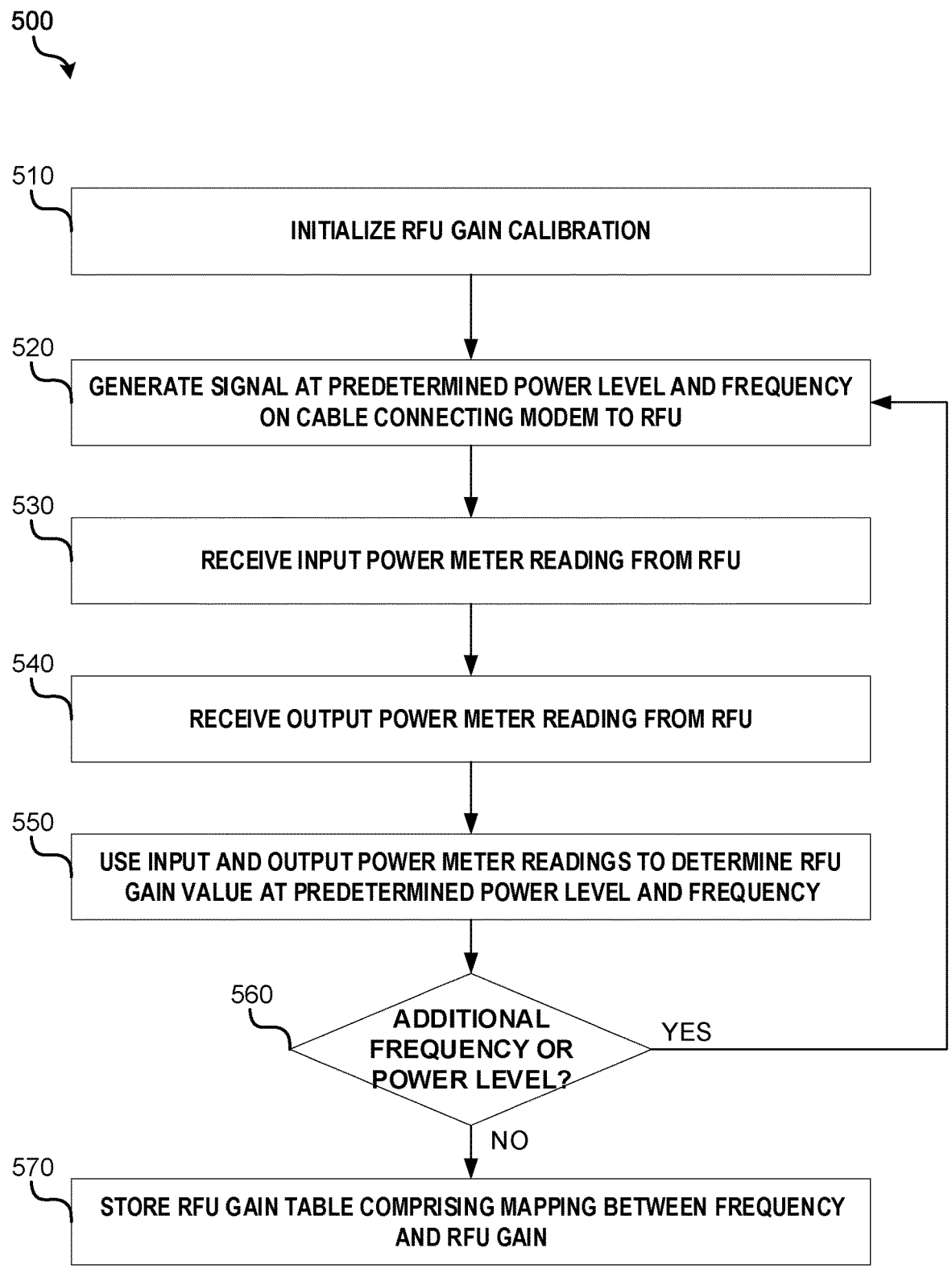
FIG. 5 is an operational flow diagram illustrating an example method of estimating RFU gain, in accordance with implementations of the disclosure.

FIG. 5 is an operational flow diagram illustrating an example method 500 of estimating RFU gain, in accordance with implementations of the disclosure. Method 500 may be implemented in a satellite terminal 100 to estimate gain of an upconverter 330 of RFU 300. In some implementations, method 500 may be implemented in response to a processing device 270 of modem 200 executing instructions 242 for generating an RFU gain table. Method 500 may be implemented at any appropriate time, including during the satellite terminal installation process, over time as components such as the upconverter 330 age, or due to environmental or other effects that could impact gain.

At operation 510, RFU gain calibration for an upconverter 330 of RFU 300 is initialized. The RFU gain calibration process may be initialized at the modem 200. In some implementations, the RFU gain calibration process is initialized at modem 200 in response to a command from a NMS, which may be a central NMS that is part of a network operations control center for a satellite communications network. In such implementations, the NMS may issue an instruction or command to satellite terminal 100 over a satellite outroute to perform the gain calibration process. The instruction may cause modem 200 to begin the calibration process.

In some implementations, RFU gain calibration is initialized at modem 200 by an installer installing the satellite terminal. In some implementations, the RFU gain calibration process is initialized on site by a local operator or maintainer of the satellite terminal equipment.

In some implementations, the RFU gain calibration process may be automatically performed on a periodic basis.

For example, the RFU gain calibration process may be automatically performed after a number of days, every week, after a number of weeks, every month, after a number of months, once a year, etc.

As part of initialization of the RFU gain calibration process, and in cases where satellite terminal 100 is a satellite terminal with a steerable antenna, the antenna may be steered award from any operational satellites such that no interference (e.g., from transmission of a CW carrier) is caused during calibration. The command to steer the antenna away may be initiated by modem 200, a NMS, and/or some other system or device that may cause the antenna to steer. Alternatively, in cases suitable for both fixed and steerable antennae, and without steering the antenna, the modem 200 may signal switch control circuitry 350 of RFU 300 over communication link 290 to open switch 360 such that the power does not leave the RFU, and thus no interference is caused during the RFU gain calibration process (e.g., from transmission of a CW carrier). In some implementations, the input power meter 310 and output power meter 330 may be set to operate in a CW mode as part of the initialization process.

As part of initialization of the RFU gain calibration process, and in cases where satellite terminal 100 is a satellite terminal with a steerable antenna, the antenna may be steered award from any operational satellites (e.g., away from the equatorial satellite plane) such that no interference (e.g., from transmission of a CW carrier) is caused during RFU gain calibration. The command to steer the antenna away may be initiated by modem 200, a NMS, and/or some other system or device that may cause the antenna to steer. Alternatively, in cases suitable for both fixed and steerable antennae, and without steering the antenna, the modem 200 may signal switch control circuitry 350 of RFU 300 over communication link 290 to open switch 360 such that the power does not leave the RFU, and thus no interference is caused (e.g., from transmission of a CW carrier). In some implementations, the input power meter 310 may be set to operate in a CW mode as part of the initialization process.

At operation 520, the modem 200 generates a signal at a predetermined power level and frequency. The signal is transmitted on a cable to an input of RFU 300. The modem 200 may generate a CW carrier signal or tone with a known frequency and power on the cable connecting the modem 200 to the RFU 300. The input power meter 310 of RFU 300 may detect a power level of the received CW signal at the input of the RFU 300. The input power meter 310 may output a power reading in watts, milliwats, microwatts, decibel milliwatts (dBm), or some other suitable form that may be converted into a power reading.

Additionally, after the CW signal passes through upconverter 320, the output power meter 330 of RFU 330 may detect a power level of the upconverted CW signal at the output of upconverter 320. Like the input power meter 310, the output power meter 330 may output a power reading in watts, milliwats, microwatts, decibel milliwatts (dBm), or some other suitable form that may be converted into a power reading. In the foregoing implementations, by virtue of making power measurements with two different CW power meters, gain may be characterized without having to have an accurate burst mode power meter.

At operation 530, the modem 200 receives the input power meter reading from RFU 300. At operation 540, the modem 200 receives the output power meter reading from RFU 300. For example, the readings may be received over communication link 290. As previously noted, communication link 290 may be part of cable 280 or separate from cable 280. For example, the modem 200 may issue a command via the DiSEqC protocol requesting the input and output power meter readings. The input and output power meter readings may be read back from power reading circuitry 340 of RFU 300.

At operation 550, an RFU gain value is determined using the received input and output power meter readings. In particular, a gain value of the upconverter 330 may be determined based on the difference of power levels at the input and output of the RFU. For example, a gain value may be defined as the ratio of the output power reading to the input power reading. In some implementations, a plurality of power measurements may be made at the input power meter 310 and output power meter 330 for a CW carrier signal transmitted at a given power level and frequency. These measurements may be averaged to obtain an averaged input power meter reading and averaged output power meter reading for a given power level and frequency. These averaged values may be used to determine the given gain value.

Thereafter, the modem 200 may vary the frequency of the measurement signal, and may also vary the output power level of the modem such that the gain of the upconverter may by characterized over a range of frequencies and/or power levels. If there are additional frequency and power levels at which to generate CW carrier signals (decision 560), operations 520-550 may iterate. As such, the generation of CW carrier signals may occur over a plurality of different frequencies and/or power levels over which the modem is designed to operate. The measurements may occur over a particular frequency band of operation. The steps or frequency ranges within the band of operation may vary.

At operation 570, an RFU gain table that provides a mapping between frequency and RFU gain may be stored. For example, the determined gain values may be stored in a data repository of the modem in the form of a table that correlates calculated gain to frequency and/or power level of the modem 200. Thus, for each frequency or frequency range at which the power output of the modem is measured, as described above, a gain value can be calculated and associated with the frequency/frequency range. In some implementations, the table may expanded through extrapolation and/or interpolation to obtain gain values for additional frequencies and/or modem power levels. For example, a linear regression may be applied to the obtained values. In some implementations, the gain table may be a two-dimensional gain table that establishes gain across the dimensions of frequency and power levels. One example of such a gain table is shown by gain table 600 of FIG. 6, which depicts gain values across n different frequencies for m different signal power levels. Although gain table 600 also shows RFU power in and power out values for the purpose of illustration, it should be noted that these values may not be included in the gain table. In alternative implementations, some other data structure besides a gain table may be used to provide a mapping between gain and frequency and/or signal power.

As noted above, the aforementioned gain calibration process may be run post-installation on an on demand basis under control of the NMS, or may be run automatically on a periodic basis. By virtue of this implementation, the terminal may be recalibrated to compensate for variations in the gain vs frequency performance of the RFU due to component aging, etc. A gain table may be automatically created post install or post replacement, with no need for configuration management of an externally generated file.

Although implementations of the disclosure have so far been described in the context of modem 200 algorithmically determining cable loss or gain calibration values based on readings from an RFU input power meter or both an RFU input power meter and RFU output power meter, it should be noted that in some implementations the RFU may include instructions and/or hardware to make such determinations, including determining cable loss values, characterizing cable loss (e.g., generating a cable loss table), estimating gain values, and/or generating a gain table. These determined values or tables may be communicated to the modem 200 over the communication link 290.

Figure 7:
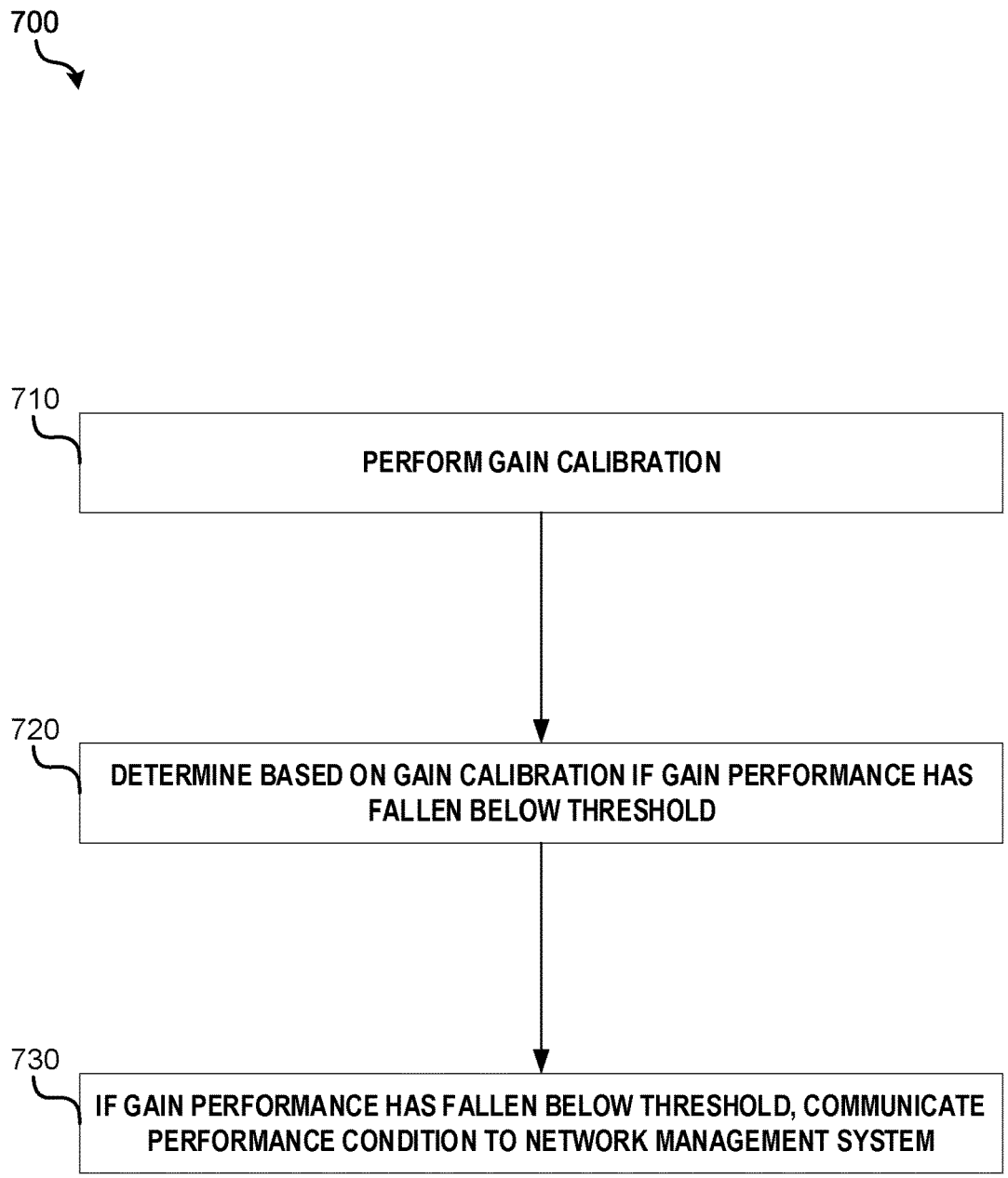
FIG. 7 is an operational flow diagram illustrating an example method that may be implemented by a modem in accordance with implementations of the disclosure.

FIG. 7 is an operational flow diagram illustrating an example method 700 that may be implemented by a modem 200 in accordance with implementations of the disclosure. For example, method 700 may be performed by a processor executing instructions stored in a computer readable medium of the modem. At operation 710, gain calibration is performed. For example, gain calibration may be performed as discussed above with reference to method 500. At operation 720, it is determined, based on the gain calibration results, whether gain performance has fallen below a threshold. For example, the calibrated gain value for each frequency/frequency range and/or power level may be compared to a threshold gain value for that frequency/frequency range and/or power level. As another example, an average of the calibrated gain values over a plurality of frequencies/frequency ranges of a power level, an average of the calibrated gain values over a plurality of power levels of a frequency/frequency range, or an average of all gain values may be compared to a threshold value. At operation 730, if it is determined that gain performance has fallen below the threshold, this performance condition may be communicated to a NMS. The RFU 300 may be flagged as being out of specification, and remedial action can then be taken proactively before the terminal fails completely. As the foregoing example illustrates, by virtue of implementing the techniques described herein, a modem may report conditions that indicate that the RF unit is performing outside of specification and may be failing.

In addition to being able to be used to establish gain characteristics of an RFU within the RFU's linear region of operation, the dual power meter configuration described herein may be used to establish the limits of the RFU's linear region of operation. By increasing power from the modem, and building up a linear projection of the RFU gain from measurements at lower power levels, the power level at which the RFU becomes non-linear could be established by finding the point at which the RFU gain no longer increases in a linear fashion. This may be particularly useful in the case of a new terminal install with an existing set of RF equipment for which the characteristics may not be known. This procedure may also be performed over time (e.g., on a periodic basis or during a maintenance event) as characteristics of the satellite terminal change over time. This implementation in combination with the foregoing systems and methods described herein may essentially allow for a complete in situ characterization of the relevant operating parameters of a RFU.

Figure 8:
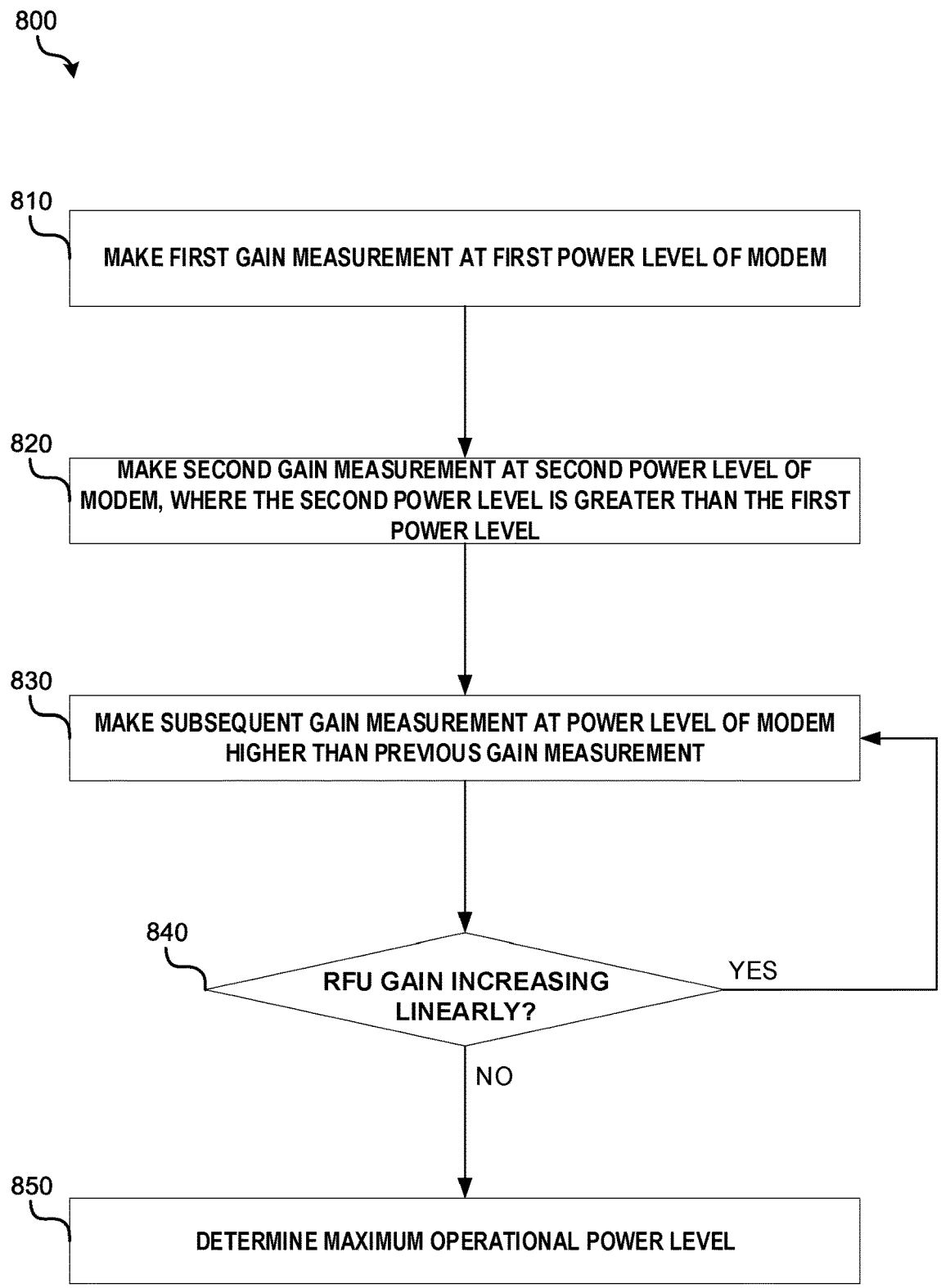
FIG. 8 is an operational flow diagram illustrating an example method of establishing the limits of an RFU's linear region of operation, in accordance with implementations of the disclosure.

To this end, FIG. 8 is an operational flow diagram illustrating one example method 800 of establishing the limits of an RFU's linear region of operation (e.g., the limits of an RFU 300), in accordance with implementations of the disclosure. In some implementations, method 800 may be initialized in a manner similar to that discussed above with reference to initializing RFU gain calibration (operation 510). For example, method 800 may be initialized by an installer of the satellite terminal, by a local operator or maintainer of the satellite terminal equipment, or in response to a command from a NMS. For example, method 800 may be initialized at modem 200 in response to a command from a NMS, which may be a central NMS that is part of a network operations control center for a satellite communications network. In such implementations, the NMS may issue an instruction or command to satellite terminal 100 over a satellite outroute to perform the process. The modem 200 may include executable instructions for performing process 800.

At operation 810, a first gain measurement may be made at a first power level of the modem (e.g., modem 200). At operation 820, a second gain measurement made be made at a second power level of the modem, where the second power level is greater than the first power level. Each of the gain measurements described with reference to method 800 may be made in fashion similar to that discussed above with reference to operations 520-550 of method 500. At operation 830, a subsequent gain measurement is made for the RFU at a power level of the modem higher than the previous gain measurement (e.g., at a third power level higher than second power level). In some implementations, the difference in power level between adjacent gain measurements may be increased in a stepwise fashion. For example, if the increase in power level from the first power level of the first gain measurement to the second power level of the second gain measurement is $\Delta P$, then the increase in power level from the second power level of the second gain measurement to a third power level of a third gain measurement may also be $\Delta P$. At decision 840, it may be determined whether RFU gain is still increasing linearly based on the current gain measurement. For example, if the change in RFU gain from the first gain measurement to the second gain measurement is approximately the same as the change in RFU gain from the second gain measurement to the third gain measurement (e.g., within some predetermined threshold), this may indicate that RFU gain is still increasing linearly with increasing power level. If gain is increasingly linearly, operations 830-840 may iterate. Alternatively, if it is determined that RFU gain is no longer increasing linearly (e.g., RFU gain increase between the last two measurements is less than some predetermined threshold from the RFU gain increase from third-to-last and second-to-last measurements), it may be determined that RFU gain measurement is no longer increasing linearly. If gain is no longer increasing linearly, at operation 850 the maximum operational power level of the linear region of operation may be determined. This may be used to set a limit on the modem's power level of operation. The maximum power level may be determined to be the highest power level corresponding to the gain measurement at which gain was still increasing linearly (e.g., second to last gain measurement).

It should be appreciated that method 800 may repeated over a range of frequencies, thus establishing the limits of the linear region over different frequencies of operation of the modem. These limits may be stored in a table or other data structure of the modem. In some implementations, process 800 may be performed concurrently with process 500. For example, the same gain measurements used to determine the limits of the RFU's linear region of operation may also be used to build a gain table.

Figure 9:
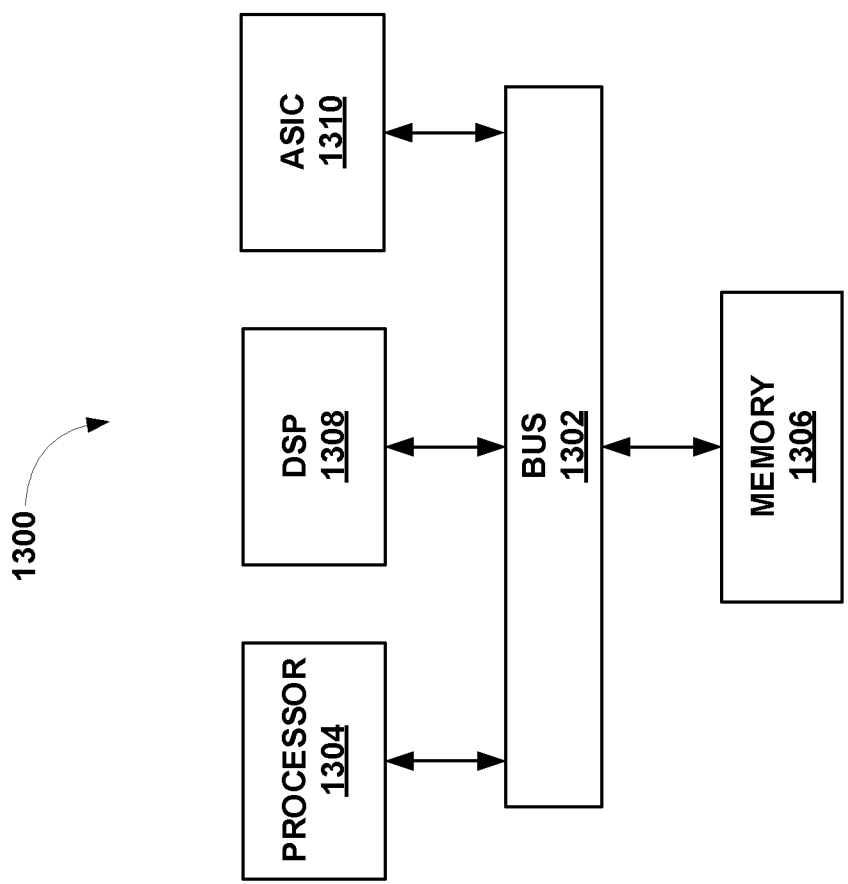
FIG. 9 illustrates a chip set in which embodiments of the disclosure may be implemented.

FIG. 9 illustrates a chip set 1300 in which embodiments of the disclosure may be implemented. Chip set 1300 can include, for instance, processor and memory components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1300 includes a communication mechanism such as a bus 1302 for passing information among the components of the chip set 1300. A processor 1304 has connectivity to bus 1302 to execute instructions and process information stored in a memory 1306. Processor 1304 includes one or more processing cores with each core configured to perform independently. A multi-core processor enables multiprocessing within a single physical package. Examples of a multi-core processor include two, four, eight, or greater numbers of processing cores. Alternatively or in addition, processor 1304 includes one or more microprocessors configured in tandem via bus 1302 to enable independent execution of instructions, pipelining, and multithreading. Processor 1304 may also be accompanied with one or more specialized components to perform certain processing functions and tasks such as one or more digital signal processors (DSP) 1308, and/or one or more application-specific integrated circuits (ASIC) 1310. DSP 1308 can typically be configured to process real-world signals (e.g., sound) in real time independently of processor 1304. Similarly, ASIC 1310 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1304 and accompanying components have connectivity to the memory 1306 via bus 1302. Memory 1306 includes both dynamic memory (e.g., RAM) and static memory (e.g., ROM) for storing executable instructions that, when executed by processor 1304, DSP 1308, and/or ASIC 1310, perform the process of example embodiments as described herein. Memory 1306 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and subcombinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A satellite terminal, comprising:
a modem; and
a radio frequency unit (RFU) configured to amplify and frequency upconvert a transmit signal for transmission over an inroute channel of a satellite communications network, the RFU comprising:
an input power meter configured to measure a first power level of an intermediate frequency (IF) signal transmitted from the modem to an input of the RFU;
an upconverter configured to frequency upconvert the IF signal to obtain a radio frequency (RF) signal; and an output power meter configured to measure a second power level of the RF signal.

2. The satellite terminal of claim 1, further comprising: a communication link between the modem and the RFU, wherein the modem is configured to receive the measured first power level and the measured second power level over the communication link.

3. The satellite terminal of claim 2, wherein the modem is configured to calculate a gain value of the upconverter using the received measured first power level and measured second power level.

4. The satellite terminal of claim 3, wherein the modem is configured to calculate the gain value by performing a gain calibration process, the gain calibration process comprising:
generating a plurality of continuous wave (CW) carrier signals, each of the plurality of CW carrier signals generated at a respective frequency within a frequency range;
transmitting each of the plurality of CW carrier signals to the input of the RFU;
for each of the plurality of transmitted CW carrier signals, receiving from the RFU a first power level measurement made by the input power meter and a second power level measurement made by the output power meter;
determining an RFU gain value for each of the frequencies based on the received first power level measurement and the second power level measurement; and
using the determined RFU gain values to create a gain table.

5. The satellite terminal of claim 4, wherein the modem is configured to periodically perform the gain calibration process.

6. The satellite terminal of claim 4, wherein the modem is configured to perform the gain calibration process in response to a command transmitted by a network management system to the satellite terminal over an outroute communication channel of the satellite communications network.

7. The satellite terminal of claim 4, wherein the input power meter and the output power meter are non-burst mode power meters.

8. The satellite terminal of claim 4, wherein the RFU comprises a switch that, when opened, prevents RF signals from entering an antenna of the satellite terminal from the RFU, wherein during initialization of the gain calibration process, the modem is configured to signal the RFU over the communication link to open the switch.

9. The satellite terminal of claim 3, wherein the modem is configured to calculate the gain value during a calibration process for establishing a limit on a linear region of operation of the RFU, the calibration process comprising:
generating each of a plurality of continuous wave (CW) carrier signals at a respective power level of a plurality of power levels;
transmitting each of the plurality of CW carrier signals to the input of the RFU;
for each of the plurality of transmitted CW carrier signals, determining an RFU gain value for each of the plurality of power levels based on power level measurements made by the input power meter and the output power meter; and
using the plurality of determined RFU gain values to determine a maximum power level of the plurality of power levels at which RFU gain stops increasingly linearly with an increasing power level.

10. The satellite terminal of claim 1, further comprising:
an IF cable connecting the modem to the RFU, wherein the modem is configured to transmit the IF signal over the IF cable; and
a communication link between the modem and the RFU, wherein the modem is configured to receive the measured first power level over the communication link.

11. The satellite terminal of claim 10, wherein the modem is configured to calculate a cable loss value over the IF cable using the received measured first power level and a power level at which the modem transmitted the IF signal.

12. The satellite terminal of claim 11, wherein the modem is configured to calculate the cable loss value by performing a cable loss calibration process, the cable loss calibration process comprising:
generating a plurality of continuous wave (CW) carrier signals, each of the plurality of CW carrier signals generated at a respective frequency within a frequency range;
transmitting each of the plurality of CW carrier signals to the input of the RFU;
for each of the plurality of transmitted CW carrier signals, receiving from the RFU a first power level measurement made by the input power meter; and
determining a cable loss value for each of the frequencies based on the received first power level measurement and a power level at which the modem generated the CW carrier signal for the frequency.

13. The satellite terminal of claim 12, wherein the modem is configured to perform the cable loss calibration process in response to a command transmitted by a network management system to the satellite terminal over an outroute communication channel of the satellite communications network.

14. A method, comprising:
generating, via a modem of a satellite terminal, a plurality of continuous wave (CW) carrier signals, each of the plurality of CW carrier signals generated at a respective frequency within a frequency range or a respective power level within a power level range;
receiving each of the plurality of CW carrier signals from the modem at an input of a radio frequency unit (RFU) of the satellite terminal, the RFU comprising an input power meter, an upconverter, and an output power meter;
for each of the plurality of received CW carrier signals:
measuring, via the input power meter, an input power level of the CW carrier signal;
upconverting, via the upconverter, the CW carrier signal; and
measuring, via the output power meter, an output power level of the upconverted CW carrier signal; and
determining an RFU gain value for each of the frequencies or power levels based on the input power level measurement and the output power level measurement.

15. The method of claim 14, further comprising: receiving at the modem, from the RFU, the input power level measurement and the output power level measurement made for each of the plurality of received CW carrier signals, wherein the modem is configured to determine the RFU gain value for each of the frequencies or power levels based on the input power level measurement and the output power level measurement.

16. The method of claim 15, wherein the modem is configured to perform the operations of generating, receiving from the RFU, and determining in response to a command transmitted by a network management system to the satellite terminal over an outroute communication channel of the satellite communications network.

17. The method of claim 15, wherein the modem is configured to periodically perform the operations of generating, receiving from the RFU, and determining.

18. The method of claim 14, wherein the input power meter and the output power meter are non-burst mode power meters.

19. The method of claim 14, further comprising: using the determined RFU gain values to create a gain table.

20. A non-transitory computer-readable medium having instructions stored thereon that, when executed by a processor, cause a modem to perform operations comprising:
  generating, via the modem, a plurality of continuous wave (CW) carrier signals, each of the plurality of CW carrier signals generated at a respective frequency within a frequency range or a respective power level within a power level range;
  transmitting each of the plurality of CW carrier signals from the modem to an input of a radio frequency unit (RFU), the RFU comprising an input power meter, an upconverter, and an output power meter;
  for each of the plurality of transmitted CW carrier signals:
    receiving an input power level measurement of the CW carrier signal made via the input power meter; and
    receiving an output power level measurement of the CW carrier signal, after upconversion by the upconverter, made via the output power meter; and
  determining an RFU gain value for each of the frequencies or power levels based on the input power level measurement and the output power level measurement.

* * * * *